United States Patent [19]

Fasching et al.

[11] 4,196,417
[45] Apr. 1, 1980

[54] SINGLE TRANSMISSION LINE INTERROGATED MULTIPLE CHANNEL DATA ACQUISITION SYSTEM

[75] Inventors: George E. Fasching; Thomas W. Keech, Jr., both of Morgantown, W. Va.

[73] Assignee: The United States of America as represented by the United States Department of Energy, Washington, D.C.

[21] Appl. No.: 854,444

[22] Filed: Nov. 23, 1977

[51] Int. Cl.$^2$ .................. H04Q 9/00; G08C 15/06
[52] U.S. Cl. ................................ 340/151; 340/206; 340/167 B
[58] Field of Search ............... 340/147 R, 151, 152, 340/167 B, 578, 206, 183

[56] References Cited

U.S. PATENT DOCUMENTS

| 3,668,640 | 6/1972 | Driscoll | 340/167 B |
|---|---|---|---|
| 3,927,404 | 12/1975 | Cooper | 340/518 |
| 3,990,036 | 11/1976 | Savit | 340/151 X |
| 4,005,273 | 1/1977 | Siems | 340/183 X |
| 4,077,030 | 2/1978 | Helava | 340/183 |
| 4,092,629 | 5/1978 | Siems et al. | 340/152 T |
| 4,093,946 | 6/1978 | Fowler | 340/151 |
| 4,099,240 | 7/1978 | Rode et al. | 340/177 CA |

Primary Examiner—Donald J. Yusko
Attorney, Agent, or Firm—R. V. Lupo; Robert M. Poteat; David E. Breeden

[57] ABSTRACT

A single transmission line interrogated multiple channel data acquisition system is provided in which a plurality of remote station/sensor circuits each monitors a specific process variable and each transmits measurement values over a single transmission line to a master interrogating station when addressed by said master interrogating station. Typically, as many as 330 remote stations may be parallel connected to the transmission line which may exceed 7,000 feet. The interrogation rate is typically 330 stations/second. The master interrogating station samples each station according to a shared, charging transmit-receive cycle. All remote station address signals, all data signals from the remote stations/sensors and all power for all of the remote station/sensors are transmitted via a single continuous terminated coaxial cable. A means is provided for periodically and remotely calibrating all remote sensors for zero and span. A provision is available to remotely disconnect any selected sensor station from the main transmission line.

5 Claims, 16 Drawing Figures

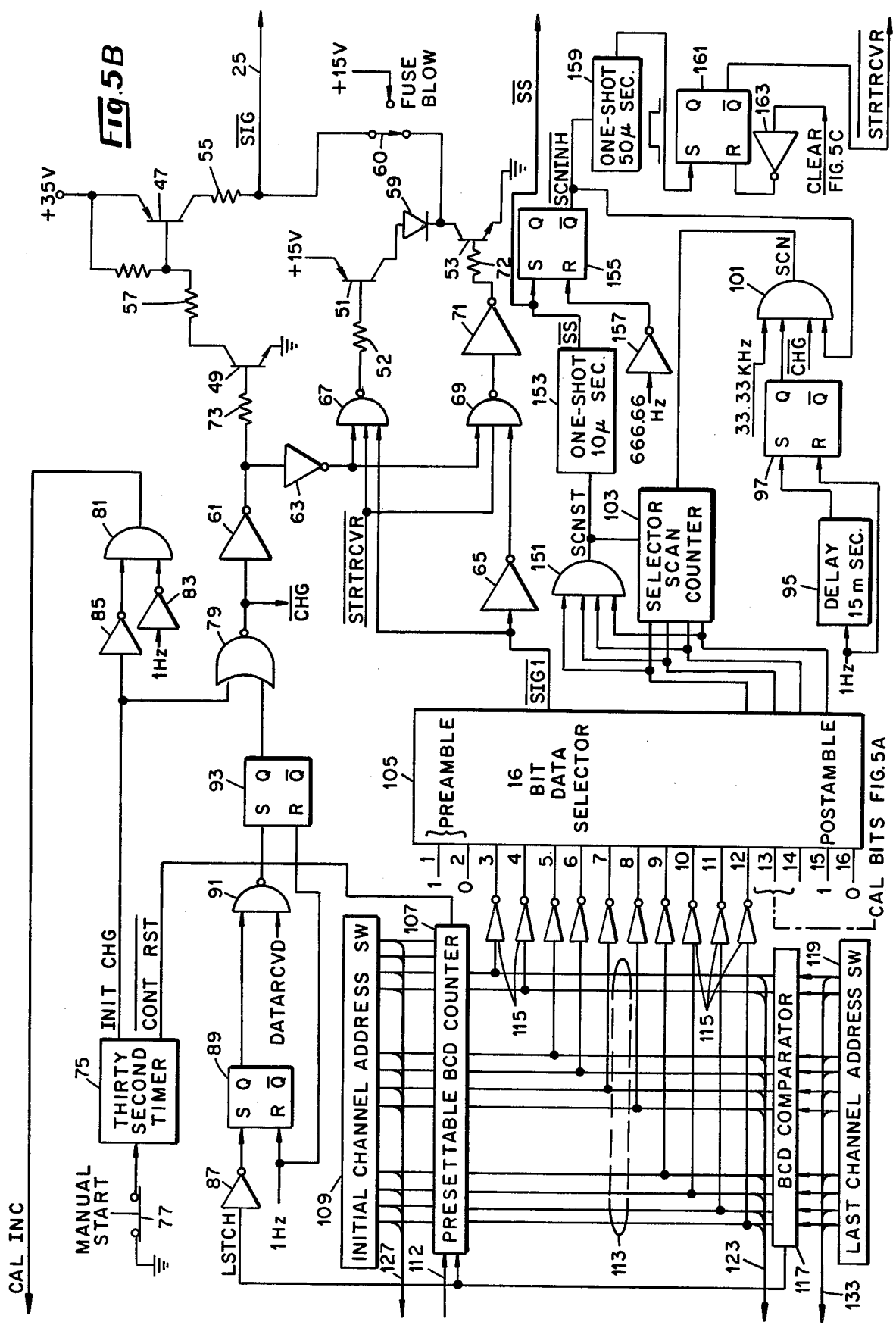

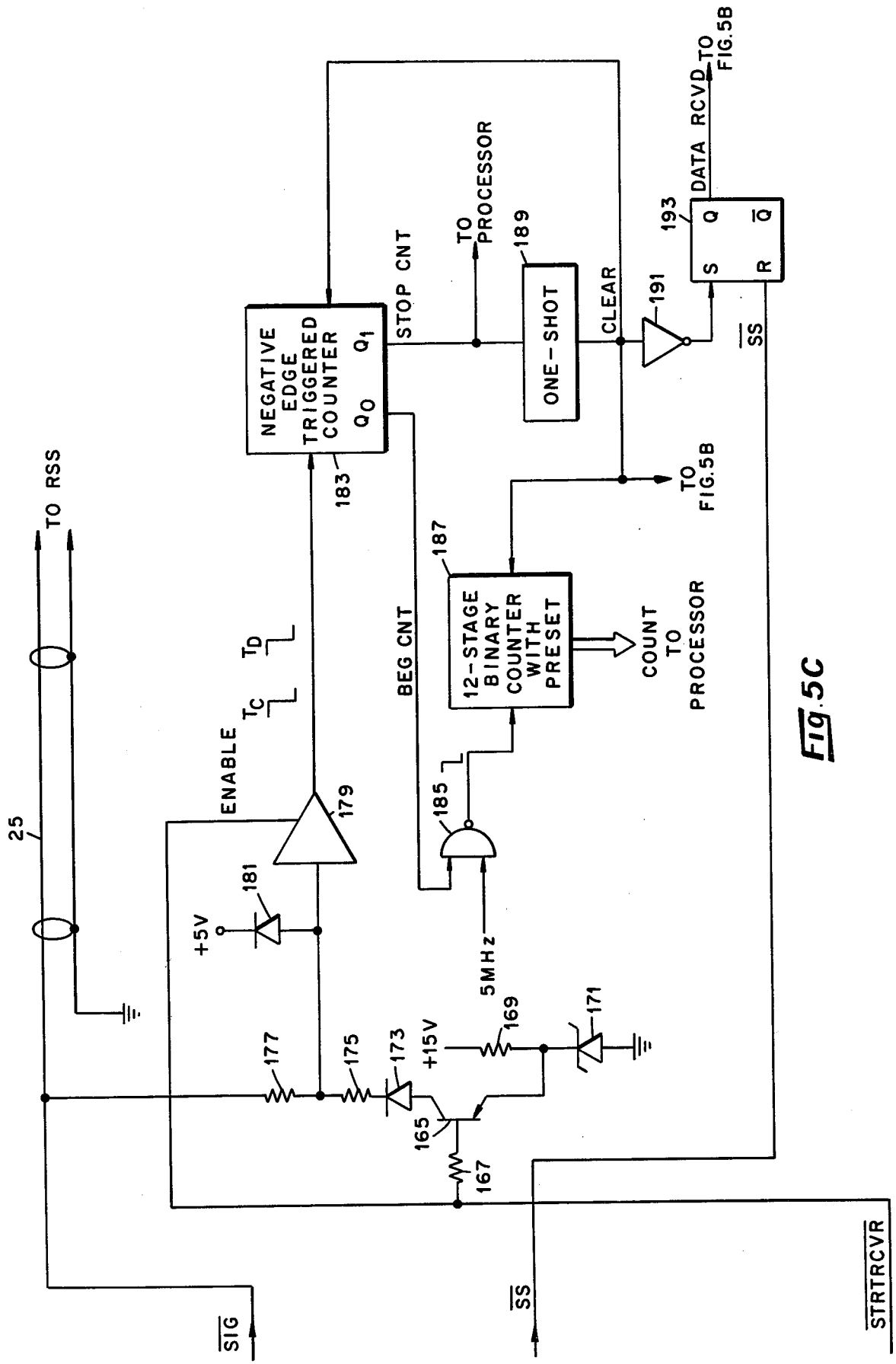

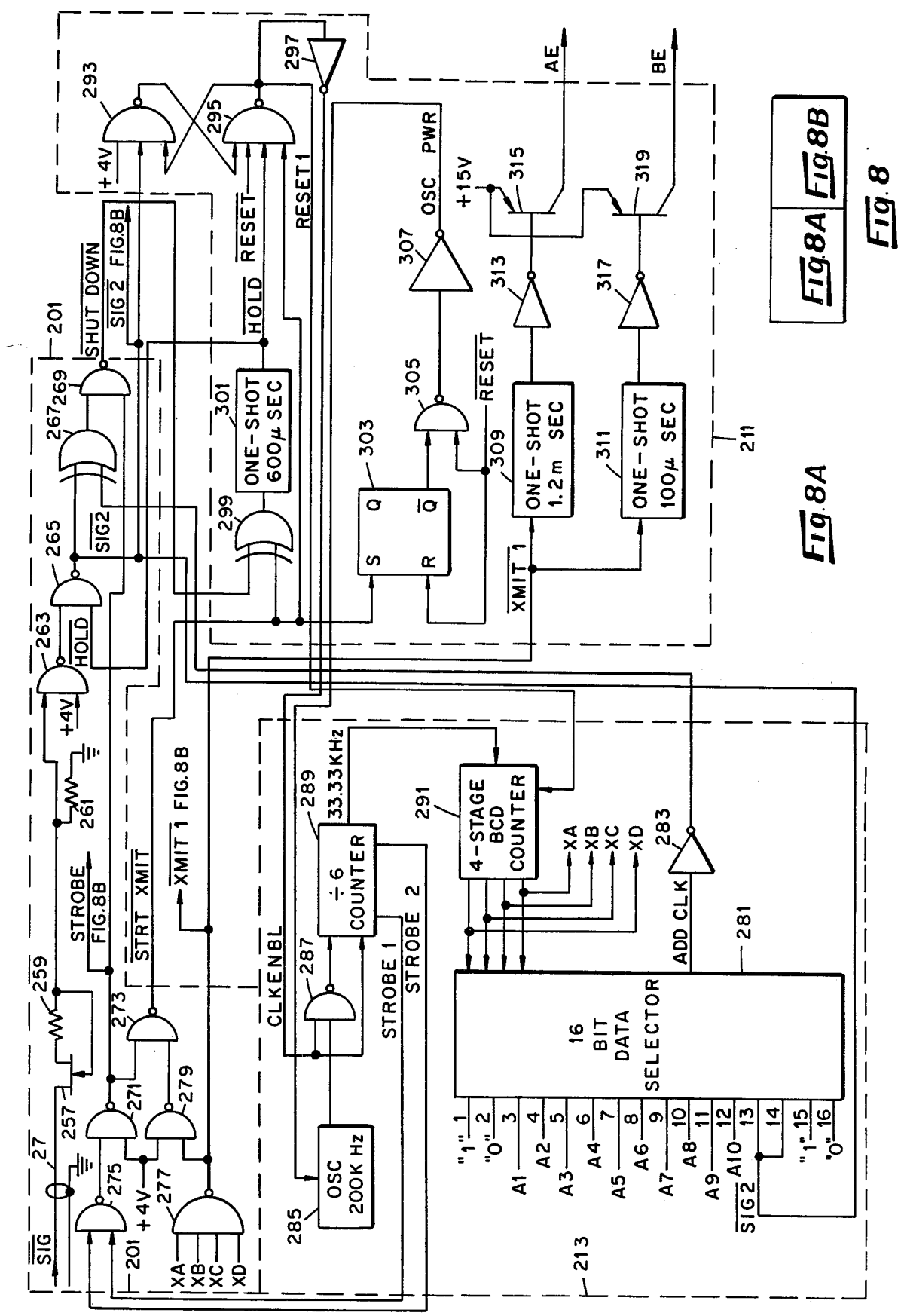

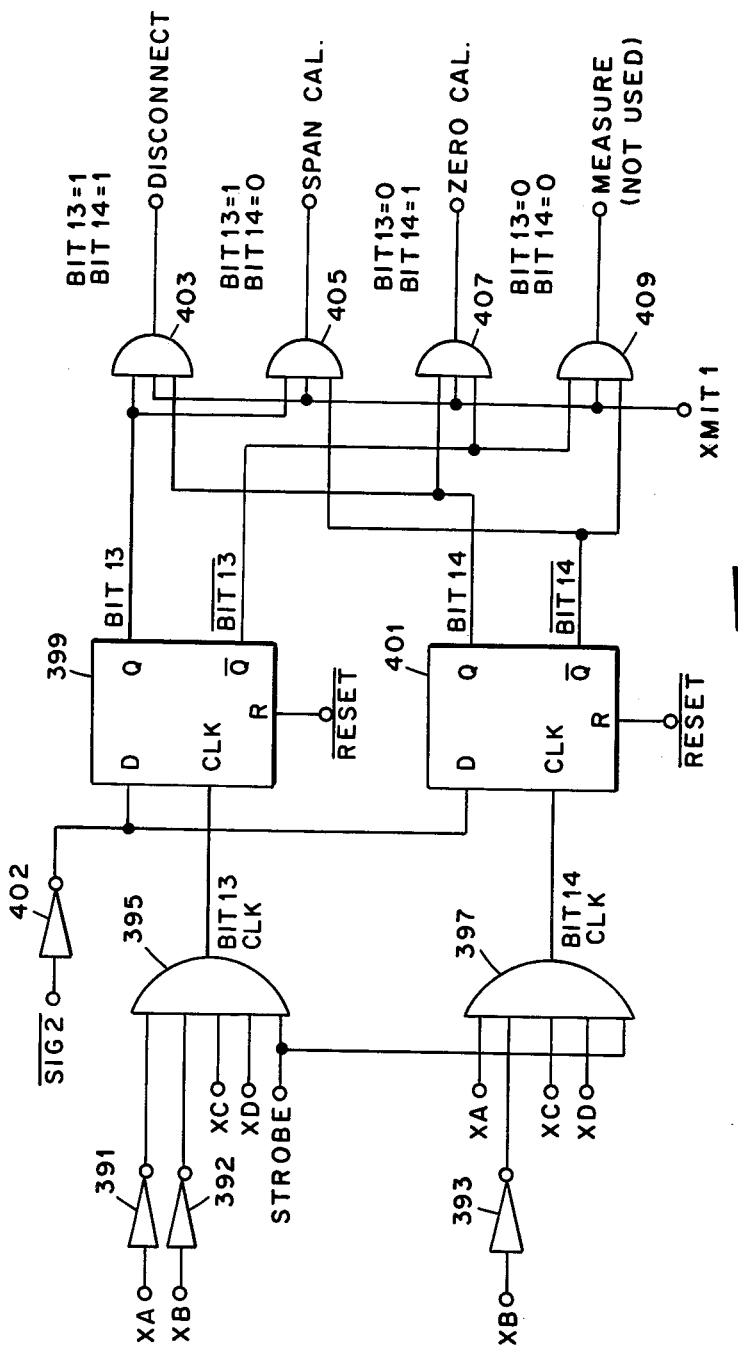

SINGLE TRANSMISSION LINE INTERROGATED MULTIPLE CHANNEL DATA ACQUISITION SYSTEM

BACKGROUND OF THE INVENTION

This invention relates generally to multiple channel data transmission systems and more specifically to a multiple channel data acquisition system in which data from a plurality of remote stations is acquired over a single transmission line through which the stations are also powered and addressed from a single master interrogating station.

In the art of multiple-channel data acquisition, it has generally been the practice to use at least one signal transmission wire pair to each remote station to collect data from a plurality of remote process variable transducers at a central receiving point. Various forms of scanning the plurality of input lines, generally under control of a computer, have been used to determine alarm conditions, measure process variables, etc.

One method uses a sensing transmitter and a pair of wires and a receiver for each process variable point to be measured. Each pair of wires from a transmitter is connected to a receiver. Power is supplied to each transmitter through the conductor pair from its respective receiver. The signal is normally a continuous current.

A second method incorporates an analog signal multiplexer wherein many voltage signals originating from remote sensors are switched onto an analog-to-digital signal converter for digital-computer processing and storage. Each input to the multiplexer requires a pair of conductors connected to each sensor at its remote location.

A third method incorporates a communication link in conjunction with multiplexing as in method 2 above. A remote transmitter converts analog signals from a plurality of sensors, separately wired to the transmitter near the data sources, to frequency-coded, time-multiplexed digital data.

In large processes that cover many acres, where the process variables to be measured are widely separated by perhaps thousands of feet, cabling cost and power consumption become extremely high for conventional multiple-channel data collection methods.

Thus, there is a need for a multiple-channel data acquisition system employing a single transmission line which may be tapped to each process variable point of measurement or monitoring, which can be operated to selectively address each process variable remote transmitter for sampling, and which can power each remote transmitter through the same single transmission line.

SUMMARY OF THE INVENTION

In view of the above need, it is an object of this invention to provide a single transmission line interrogated multiple-channel automatic data acquisition system.

Another object of this invention is to provide an automatic data acquisition system as set forth in the above object wherein remote sensor stations for monitoring variables are connected in parallel to said transmission line and wherein each of said stations is supplied power via said transmission line from a master interrogating station by means of a shared, charge transmit-receive cycle.

Yet another object of this invention is to provide an automatic data acquisition system as set forth in the above objects including means for periodically and remotely calibrating all remote sensors for zero and span.

Further, it is an object of this invention to provide an automatic data acquisition system as set forth in the above objects including means for remotely disconnecting any selected sensor from the transmission line.

Other objects and many of the attendant advantages of the present invention will be obvious from the following detailed description of the invention taken in conjunction with the drawings.

BRIEF DESCRIPTION OF THE DRAWINGS

FIG. 9 is a truth table for control bits of a remote station address signal.

FIG. 10 is a logic diagram of the control bits decoder shown in block form in FIG. 8B.

DETAILED DESCRIPTION

Figure 1:
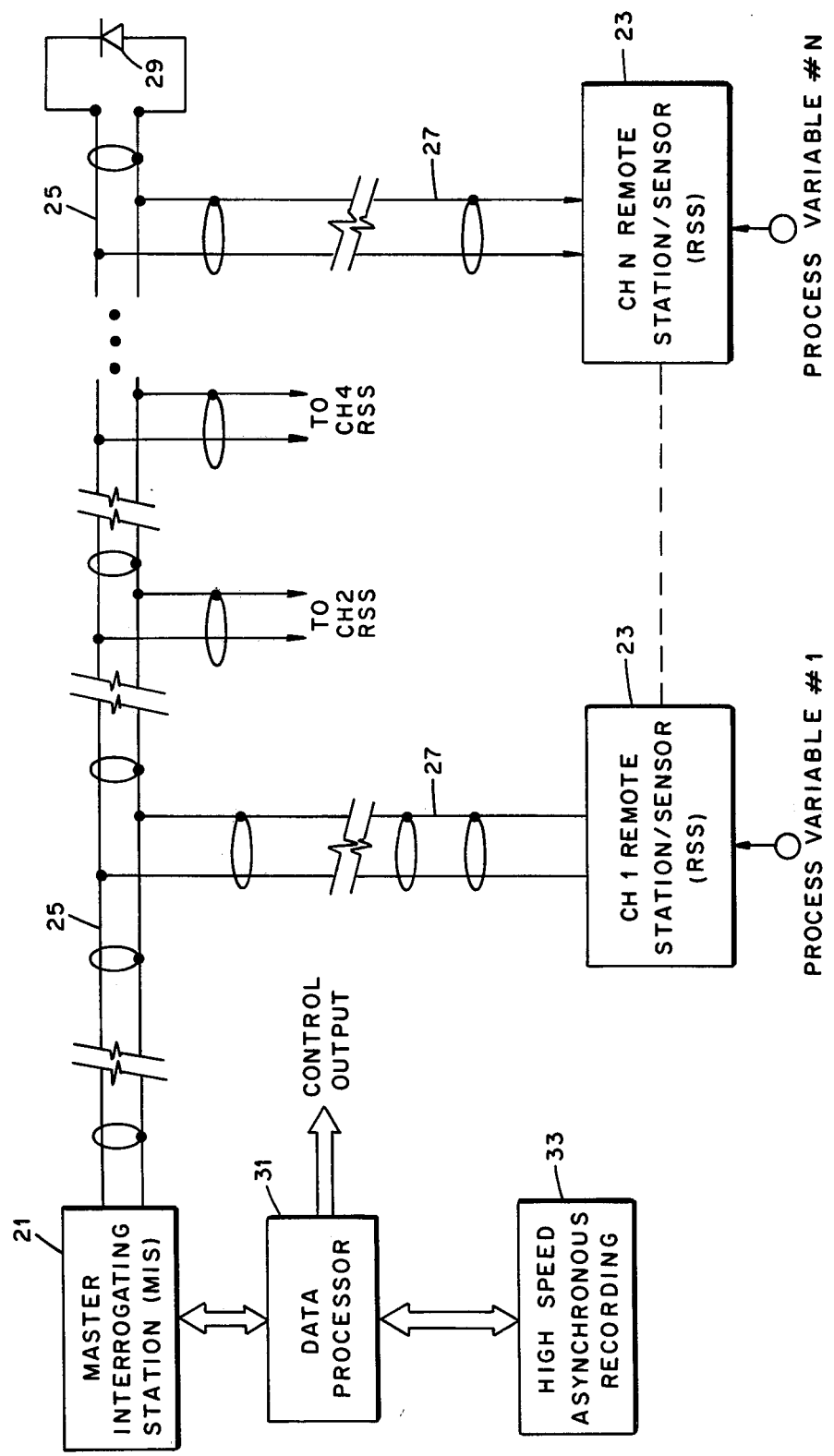
FIG. 1 is a basic block diagram of a single transmission line interrogated multiple-channel data acquisition system according to the present invention.

Referring now to FIG. 1, wherein there is shown a simplified block diagram of the major components of a multiple-channel data acquisition system according to the present invention, a master interrogating station (MIS) 21 automatically supplies power to calibrate, address and receive measurement data from each of a plurality of remote station/sensor (RSS) 23 through a single coaxial cable transmission line 25, which may include parallel branch lines 27 to each RSS 23. The transmission line 25 is terminated by means of a diode 29 at the remote end to reduce base line undershoot caused by loading mismatch.

Upon recognizing its calling address, the particular channel (1-N) remote station/sensor 23 responds by performing a measurement of the process variable, converts the signal to digital pulse position code and transmits the pulse position code to the MIS 21 via the particular branch line 27 and main line 25. The pulse pair is converted to a binary digital value by the MIS 21. The digital value may be transferred to a digital processor 31 and recorded on a high-speed asynchronous recorder 33. After conditioning by processor 31, the data may be used to generate a process control signal. Although the invention will be illustrated by means of an embodiment for data collection only, it will be obvious that the system could be used in a process control arrangement in which data points would be sampled in the same manner. The station/sensor 23 for the particular process variable (1-N channels) may be physically tapped to the line 25 directly or via branch lines 27 at any point along the line and in any sequence.

Figure 2:
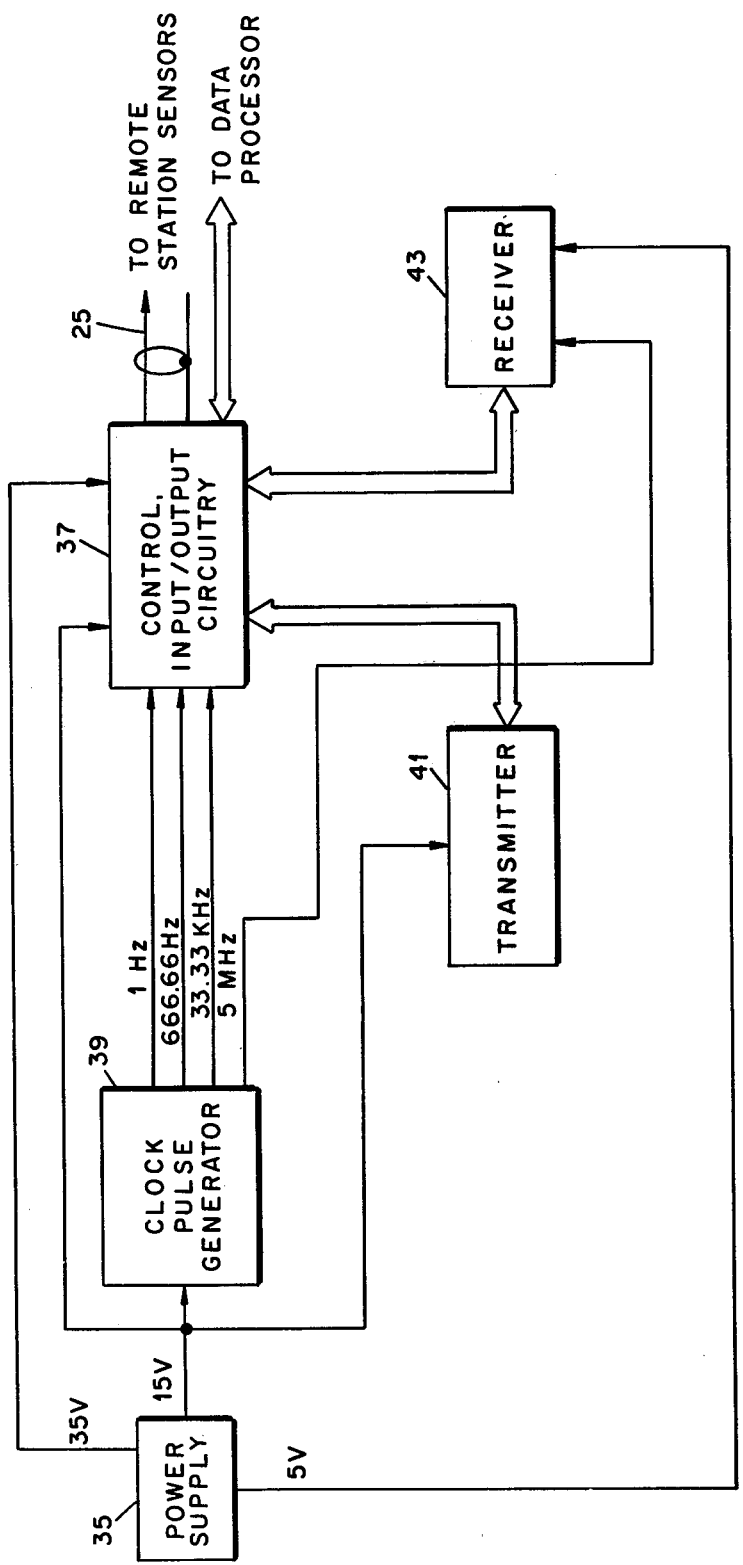
FIG. 2 is a block diagram of the master interrogating station shown in single block form in FIG. 1.

Referring now to FIG. 2, the master interrogating station is shown in block diagram form. It consists of five main parts. As will be described in more detail hereinbelow, the system operates in three different transmission modes which are recognized by three different voltage levels applied to the transmission line 25 by the MIS 21. These voltages are supplied by a main power supply 35 which also provides power to the various components of the MIS 21. The data flow, remote sensor charging voltage, and addressing are managed by input-output circuitry 37 under timing control provided by a clock pulse generator 39. The basic clock frequency is five megahertz which may be derived from a conventional crystal controlled oscillator. The oscillator output is then divided down by a series of conventional counters which use standard feedback techniques to achieve division by the proper factors to obtain the desired clock rates of 33.33 kHz, 666.66 Hz and 1 Hz, in addition to the basic 5 MHz rate.

Figure 3:
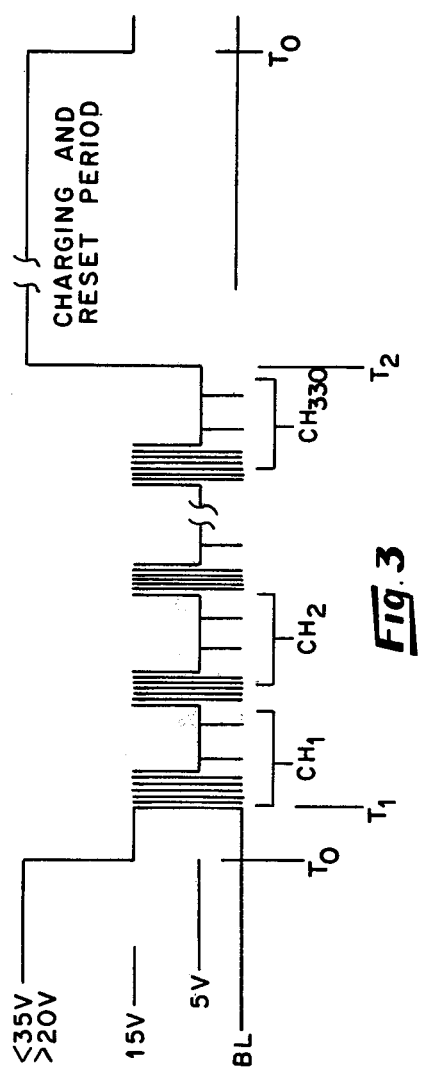
FIGS. 3 and 4 are signal timing diagrams depicting the various operating phases within an interrogating cycle.
Figure 4:
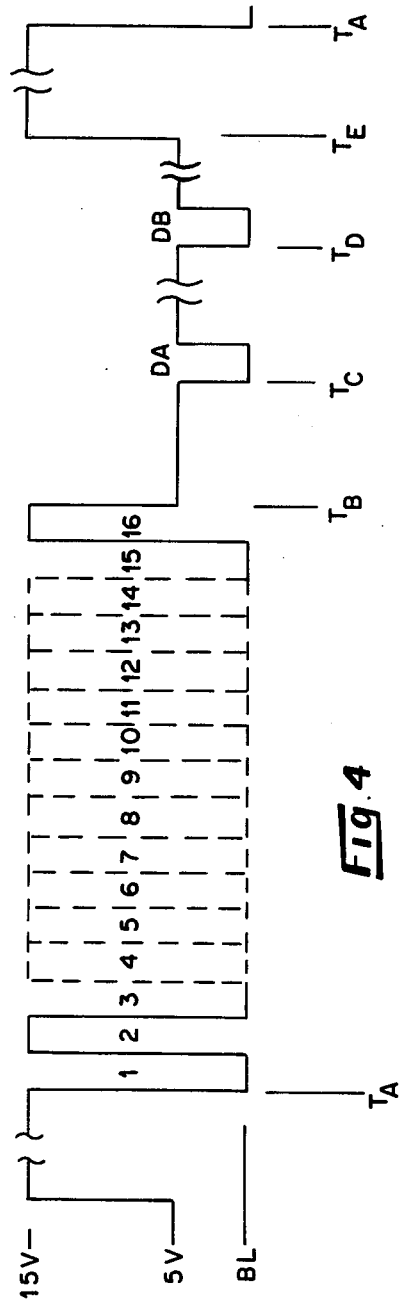

Under control of the clock 39, the control circuit 37 basically regulates the transmission of signals to and from the remote stations/sensors and the data processor, as will be described in detail hereinbelow. As shown in FIGS. 3 and 4, the charging, transmitting and receiving modes of the MIS 21 are of a repetitive nature having a fundamental period of one second. An initial startup mode alters this to the extent that the line 25 is charged at 35 volts for thirty seconds prior to entering the automatic mode. This is required to provide the remote station/sensors with initial operating power which is stored in the remote station storage capacitors. During a fundamental period of one second, the following general sequence is controlled: (1) the line driver switches the line from the charging level (35 volts) to the transmitting level (15 volts); (2) after a 15-millisecond delay ($T_0$–$T_1$) to allow the remote station oscillators to stabilize, the first channel interrogation signal is transmitted; (3) at the start of the sixteenth bit of the interrogation signal (address and control sequence), the line is released to the addressed remote station/sensor; (4) the receiver 43 (FIG. 2) is then enabled to the line 25 and in approximately one hundred microseconds ($T_B$–$T_C$), the initial data pulse (DA) is received and during the next one to nine hundred microseconds ($T_C$–$T_D$), the final data pulse DB is received; (5) the pulse position data to the receiver is then converted to digital format (up to sixteen parallel bits) and then output to the data processor 31; (6) the line is then reacquired and held at the transmit level (15 volts) for 40 microseconds to allow a buffering time for the system; (7) the first channel is interrogated three times during the first second to obtain zero, span and process variable values; (8) the second channel is then interrogated for process variable value; (9) step 8 is then repeated for all channels up to and including the last channel; (10) then the line is returned to the charge level (35 volts) to begin the next scan, repeating the steps. The only difference between the first and Kth one-second scan intervals is that the Kth channel is the only one that is interrogated three times. Thus, if there are N channels, then every N seconds each channel is checked for zero and span (calibrated) one time in addition to having its process variable measured N times. The choice of zero, span or process variable measurement is determined by the control bits 13 and 14 of the serial address signal as shown in FIG. 4.

Figures 5, 5A:
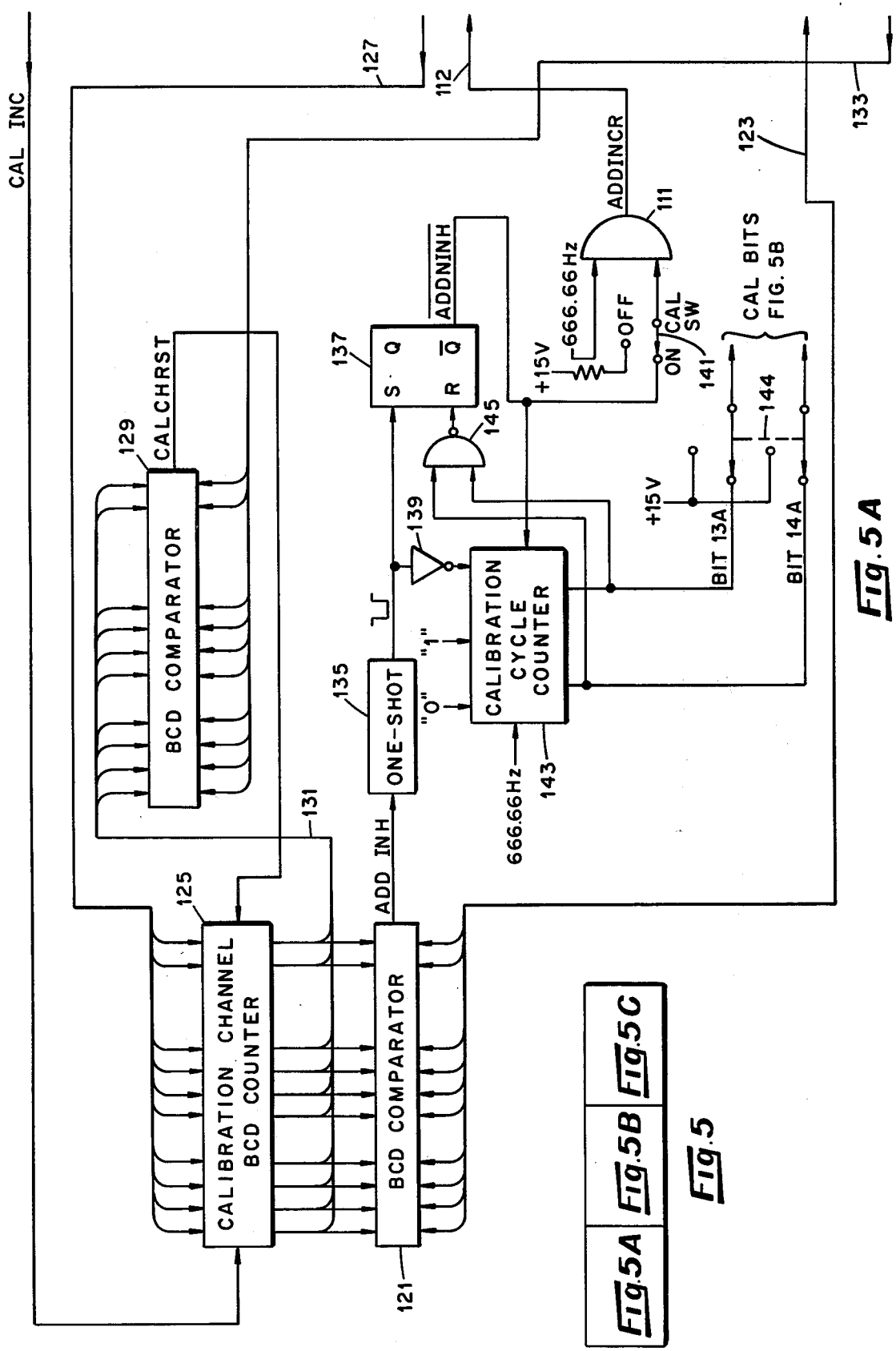
FIG. 5, which consists of FIGS. 5A, 5B and 5C arranged as shown in FIG. 5, is a logic diagram of the master interrogating station shown in block diagram form in FIG. 2.

Referring now to FIG. 5, which includes FIGS. 5A, 5B and 5C arranged as shown in FIG. 5, the MIS 21 components are shown in logic diagram form. The control circuit contains two line drivers, one for charging the line 25 and one for transmitting the address and control information bits. The line 25 driver circuitry, shown in FIG. 5B, includes a first line driver consisting of transistors 47 and 49 used to charge the line and a second line driver consisting of transistors 51 and 53 used to transmit address and control information. Transistor 47 has its emitter connected to the 35 volt power source and its collector connected through a resistor 55 to the center conductor of the coaxial cable transmission line 25. The collector of transistor 49 is connected through a resistor 57 to the base of transistor 47 and its emitter is connected to ground. A logic "high" condition at the base of transistor 49 turns both transistors 47 and 49 "On", placing the 35 volt charging voltage on the line 25.

The address and control information is transmitted at the 15-volt operating level by means of transistors 51 and 53. Transistor 51 has its emitter connected to the 15-volt supply and its collector is connected to the $\overline{SIG}$ line 25 through a blocking diode 59 and a switch 60. Diode 59 has its anode connected to the collector of transistor 51. Transistor 53 is connected between the line 25 and ground, so that when it is turned "On", while transistor 51 is turned "Off", the line is at the logic "1" level (zero volts). When transistor 51 is "On" while transistor 53 is "Off" the line is at the logic "0" or 15-volt level. Thus, the switching of transistors 51 and 53 controls the serial address and control information output on line 25.

Logic gates 61 through 71 decode the control signals $\overline{CHG}$ and $\overline{SIG\ 1}$ to place the line in the proper state. The $\overline{CHG}$ signal line is connected to the input of an inverter 61 whose output is connected through a resistor 73 to the base of transistor 49. Thus, when the $\overline{CHG}$ signal is low the output of inverter 61 is high, turning transistor 49 "On".

The output of inverter 61 is connected through an inverter 63 to corresponding inputs of NAND gates 67 and 69. Another input of gate 67 is connected to the $\overline{SIG\ 1}$ line and the output is connected to the base of transistor 51 through a current limiting resistor 52. The $\overline{SIG\ 1}$ line is also connected through an inverter 65 to another input of NAND gate 69. The output of gate 69 is connected through inverter 71 and a current limiting resistor 72 to the base of transistor 53.

When the $\overline{CHG}$ signal is high, transistors 47 and 49 are turned "Off", the output of inverter 63 is high, and assuming $\overline{SIG\ 1}$ is high, the output of gate 67 is low, turning transistor 51 "On" to apply the 15-volt level to the line. The base of transistor 53 is also held low keeping it turned "Off". However, each time $\overline{SIG\ 1}$ goes low, the output of gate 69 goes "low" causing the output of inverter 71 to go "high" turning transistor 53 "On". At the same time the output of gate 67 goes high turning transistor 51 "Off". This applies ground (zero volts) to the line. Thus, the address and control information is serially fed onto the line 25 following the charge mode. At the end of the address and control bit transmission, both the $\overline{CHG}$ and $\overline{SIG\ 1}$ signals remain high. In order to keep both transistors 51 and 53 turned "Off" during the receive mode to release the $\overline{SIG}$ line 25 to the addressed remote station, a $\overline{\text{STRTRCVR}}$ line is connected to separate inputs of NAND gates 67 and 69. This signal is low during the remote station transmitting period and disables gates 67 and 69, keeping transistors and 51 and 53 turned "Off". The control circuit portion for generating the $\overline{\text{STRTRCVR}}$ signal will be described hereinbelow.

The initial thirty second charge mode is provided by a manually activated thirty second timer circuit 75. The circuit is activated through a manual push button switch 77 connected to the input of circuit 75. The initiate charge (INIT CHG) output is connected to one input of a NOR gate 79 whose output provides the $\overline{\text{CHG}}$ signal line. The timer 75 has a second output which forms a count reset ($\overline{\text{CONT RST}}$) signal line which is "low" when INIT CHG is "high".

Also during the initial thirty second charge period, the calibration channel counter is inhibited. The calibration channel is normally incremented at the end of each one-second channel scan interval by means of connecting the 1 Hz signal line to the input of AND gate 81 through an inverter 83. The gate 81 provides the calibrate increment (CALINC) signal line. Gate 81 is inhibited during the initial charge interval by connecting the INIT CHG line output of timer 75 through an inverter 85 to the second input of gate 81. Thus, when the INIT CHG signal goes high, gate 81 inhibits the 1 Hz signal from passing to the CAL INC line.

After the initial startup period, charging is controlled automatically. As shown in the timing diagram of FIG. 3, the line 25 is charged following each scan during the time $T_2-T_0$ (approx. 500 ms). When the transmitter has scanned through to the last channel, the last channel signal (LSTCH) line goes high momentarily. This line is connected through an inverter 87 to the set (S) input of an R-S flip-flop 89 and the LSTCH pulse sets flip-flop 89 which remains set until the 1 Hz clock pulse (a low-going pulse) is applied to the reset (R) input of flip-flop 89. The set (Q) output of flip-flop 89 is connected to one input of a NAND gate 91 which has its second input connected to the data received (DATARCVD) line from the receiver (FIG. 5C). The DATARCVD signal is normally low and inhibits the gate 91 until the last channel data has been received, at which time it goes high enabling gate 91. The output of gate 91 is connected to the set (S) input of an R-S flip-flop 93 which has its reset (R) input connected to the 1 Hz clock line. The set (Q) output of flip-flop 93 is connected to NOR gate 79. Thus, when flip-flop 89 is set (Q output high) and the DATARCVD signal goes high, the output of NAND gate 91 goes low, setting flip-flop 93. Its Q output goes high thereby turning the charge drive transistors 47 and 49 "On" as explained above for the initial charge cycle.

Following the charge cycle the transmitter is enabled following a 15-millisecond delay by delay circuit 95 (FIG. 5B) connected to receive the 1 Hz clock pulse at time $T_0$ (FIG. 3). The output of delay circuit 95 is connected to the set input of an R-S flip-flop 97. The reset (R) input of flip-flop 97 is connected to receive the 1 Hz clock signal. Thus, the 1 Hz clock pulse resets flip-flop 97 at time $T_0$ which is in turn set by the 15-millisecond delayed 1 Hz clock pulse at time $T_1$. The set (Q) output of flip-flop 97 is connected to one input of an AND gate 101. AND gate 101 has two other qualifying inputs $\overline{\text{CHG}}$ and scan inhibit ($\overline{\text{SCNINH}}$) which must be high before gate 101 will pass the 33.33 kHz clock pulses to the scan (SCN) signal line during the time $T_A-T_B$ (FIG. 4). The $\overline{\text{CHG}}$ line is low during the charge mode and the $\overline{\text{SCNINH}}$ line is low during the receive mode which prevents the address selector scan counter 103 of the transmitter from operating during these portions of a scan period.

The selector scan counter 103, which is incremented at the 33.33 kHz clock rate, is a conventional 4-bit binary counter with the corresponding 4-bit outputs connected to the data select inputs of a conventional 16-bit data selector 105. The output of the data selector 105 provides the $\overline{\text{SIG 1}}$ address and control data to line 25. The data selector has 16 data inputs which are selected one at a time and fed serially onto the $\overline{\text{SIG 1}}$ line at the 33.33 kHz clock rate as the counter 103 is counted through 16 counts (0–15). The order of selection of the 16 inputs into the serial output ($\overline{\text{SIG 1}}$) is from the top to the bottom (1–16). A corresponding data selector is provided in each of the remote station sensors tied to the $\overline{\text{SIG}}$ line 25 with their address codes applied to the data inputs and the selectors are all scanned at the same rate as long as the address code matches the transmitted address code. The remote station which scans through the complete address is the station being addressed, as will be explained in detail hereinbelow.

The first two address bits, the preamble bits, are always the same (1) a logic "1" (or ground) and (2) a logic "0" (+15 V). Bits 3–12 contain the address, bits 13 and 14 are control bits instructing the zero, span, process variable measurement, or disconnect, depending on the code of these bits. Bits 15 and 16 are postamble bits, like the preamble bits are always the same ("1" and "0", respectively). Thus the proper logic level voltages are connected to the preamble and postamble bits inputs to provide the indicated logic levels.

To obtain the address and determine when the last channel has been addressed in a scan cycle, a BCD presettable counter 107 is connected to a bank of initial channel address switches and BCD converters 109 at its count preset inputs. The switches may be conventional thumbwheel switches from which an operator selects the first channel address and the selected value is converted to binary coded decimal (BCD). After the initial channel address is set and the manual start switch 77 is depressed, the initial channel BCD value is preset into counter 107 by the activation of the count rest ($\overline{\text{CONT RST}}$) line from the timer 75. After the initial charging period, the circuit enters the automatic scan mode and the address is incremented (ADDINCR) at the 666.66 Hz clock rate through an AND gate (FIG. 5A) 111 whose output is connected to the count input of counter 107 via line 112. The address count, which is registered by the counter 107 count output lines (10 bits), is fed to the data inputs (3–12) of the data selector 105 through individual inverters 115. The count lines 113 are also fed into corresponding inputs of a BCD comparator 117 in which the last channel address, available from a last channel address switch and BCD converter bank 119, connected in a BCD arrangement to the comparator 117, is compared with the present address. When the counter 107 exceeds the last channel value, detected by comparator 117, the output (LSTCH) of comparator 117 goes high. The LSTCH channel signal resets and presets counter 107 to the initial channel address selected by the operator. Normally, the preset value is the first channel and the scan automatically proceeds, scanning each channel at a 666.66 Hz rate.

During each scan cycle, one of the channels is calibrated automatically. This is accomplished by means of a BCD comparator 121 (FIG. 5A) which has one set of BCD inputs connected via cable 123 to the corresponding BCD outputs of counter 107 (FIG. 5B) and a BCD presettable calibration channel address counter 125. Counter 125 is identical to counter 107 and has count preset inputs connected thereto via cable 127 from the initial channel address switches 109. The BCD outputs of counter 125 are connected to corresponding inputs of comparator 121 and an additional comparator 129 via cable 131. The other set of BCD inputs to comparator 129 is connected via cable 133 to the last channel address switches 119. The calibration channel address counter is incremented at the 1 Hz rate by the CALINC signal from gate 81 (FIG. 5B). The counter 125 is reset and preset by a CALCHRST signal generated on an output line of comparator 129 connected to the reset and preset input of counter 125. The CALCHRST signal goes high when the last channel has been calibrated.

The output of the comparator 121 (ADD INH), which goes high when the calibration channel address is the same as the present channel address from counter 107, is connected to the input of a one-shot 135 whose output goes low for 1 microsecond when ADD INH goes high. The output of one-shot 135 is connected to the set (S) input of an R-S flip-flop 137 which is set each time the output of one-shot 135 goes low. The reset output ($\overline{Q}$) of flip-flop 137 is connected to one terminal of a two-position calibration selector switch 141 which has its second terminal connected to the +15 volt source. The common terminal of switch 141 is connected to a second input of AND gate 111 to control the ADDINCR signal to counter 107. When switch 141 is in the "Off" position, the circuit does not enter the calibration mode. When the switch is in the "On" position, the ADD INR signal (666.66 Hz) is inhibited when a channel is being calibrated, causing the $\overline{Q}$ output of flip-flop 137 to go low inhibiting the 666.66 Hz clock pulses from passing to counter 107 until flip-flop 137 is reset.

The output of one-shot 135 is also connected through an inverter 139 to the preset input of a two-bit binary counter 143. The preset inputs are connected to ground (logic 0) and +5 volt (logic 1), respectively, so that the counter is preset to a binary 01 count. The counter is advanced at a 666.66 Hz rate to the binary count 11 by connecting the 666.66 Hz clock rate line to the count input of counter 143. The count output lines are connected through a double pole selector switch 144 to calibration bits (13–14) data inputs of the data selector 105 (FIG. 5B). When the counter is counted to the binary count 11, flip-flop 137 is reset by connecting the outputs of the counter 143 to the inputs of a NAND gate 145 whose output is connected to the reset input of a flip-flop 137. The $\overline{Q}$ output of flip-flop 137 is also connected to a count enabling input of counter 143, so that the counter only operates during a calibration sequence.

The counter 143 is preset to state 01 which causes a zero measurement of the addressed channel transducer being calibrated, the next state, 10, causes a span measurement and the next state, 11, releases the address inhibit signal $\overline{ADD\ INH}$ and the counter immediately resets to state 00 which codes the regular transducer variable measurement. When a channel is calibrated, the ADD INCR signal is inhibited and during the next three transmissions only bits 13 and 14 of the data selector 105 are altered by the 666.66 Hz scan signal through the calibrate cycle counter 143 to provide the desired channel calibration control bit sequence.

On the next scan cycle the next channel in the address sequence is calibrated and so on until the last channel is addressed as recognized by BCD comparator 129. The CALCHRST signal goes high thereby resetting and presetting the calibration channel counter 125 to the initial channel as determined by the initial channel selector switches 109. If no automatic calibration is required, the calibration switch 141 is turned to the "Off" position, the counter 143 remains in the 00 state by the high logic level of $\overline{ADD\ INH}$ and only the process variable measurement for each channel is made durig each scan cycle.

Returning now to FIG. 5B, the remaining control portion of the circuit for determining when the receiver portion (FIG. 5C) is to be activated during the scan cycle will be described. The selector scan counter 103 count outputs are connected to the corresponding four inputs of an AND gate 151. At the end of 16 counts, all of the data selector inputs have been scanned and the output of gate 151 (SCNST) goes high. This output is connected to the reset input of the counter 103 and resets the counter when the scan stop (SCNST) signal goes high.

The SCNST output is also connected to the input of a one-shot 153 which generates a 10 microsecond negative going pulse $\overline{SS}$ at its output each time SCNST goes high. The output of one-shot 153 is connected to set (S) input of an R-S flip-flop 155. The reset output ($\overline{Q}$) of flip-flop 155 provides the scan inhibit signal $\overline{SCNINH}$ to disable AND gate 101 during the receive mode. The reset input of flip-flop 155 is connected through an inverter 157 to the 666.66 Hz clock source. The reset output of flip-flop 155 is also connected to the input of a one-shot 159 which provides a 50 microsecond delay of the $\overline{SCNINH}$. The output of one-shot 159 is connected to the set input of an R-S flip-flop 161. When the one-shot 159 times out the signal goes low setting flip-flop 161. This causes the reset output $\overline{Q}$ to go low, generating the start receiver ($\overline{STRTRCVR}$) signal which activates the receiver. The reset input of flip-flop 161 is connected through an inverter 163 to the CLEAR signal line from the receiver section (FIG. 5C), which goes high when the addressed channel data value or calibration value has been read. When CLEAR goes high, the output of inverter 163 goes low resetting flip-flop 161 which disables the receiver.

Referring now to FIG. 5C, it will be seen that the $\overline{STRTRCVR}$ line is connected to the base of a transistor 165 through a resistor 167. The emitter of transistor 165 is connected to the +15 volt source through a resistor 169 and to the cathode of a zener diode 171 which has its anode connected to ground. The collector of transistor 165 is connected to the anode of a diode 173 which has its cathode connected to the $\overline{SIG}$ line 25 through a pair of series resistors 175 and 177. The input of amplifier 179 is connected intermediate resistors 175 and 177 and to the anode of a diode 181 which has its cathode connected to the +5 volt source. The amplifier 179 also has an enabling input connected to the $\overline{STRTRCVR}$ line which enables the amplifier when $\overline{STRTRCVR}$ goes low at time $T_B$ (FIG. 4), following a 50 microsecond delay provided by one-shot 159 (FIG. 5B).

The output of amplifier 179 is connected to the count input of a negative edge triggered counter 183. Counter 183 is a two-bit counter with corresponding outputs $Q_0$ and $Q_1$. The begin count BGN CNT output ($Q_0$) of counter 183 is connected to one input of a NAND gate 185 which has the 5 MHz clock line connected to the other input. The output of NAND gate 185 is connected to the count input of a 12-stage binary counter 187.

The stop count STOP CNT output ($Q_1$) of counter 183 is connected to the input of a one-shot 189 which provides a short delay before generating a clear signal. The clear signal output of one-shot 189 is connected to the clear input of counters 183 and 187 and to the input of an inverter 191 whose output is connected to the set input of an R-S flip-flop 193. The reset input of flip-flop 193 is connected to the $\overline{SS}$ line, which is the output of one-shot 153 (FIG. 5B). Each time the output of one-shot 153 goes low, following a data selector scan, flip-flop 193 is reset by $\overline{SS}$ and then set when the particular addressed channel data has been received. Thus, the Q output of flip-flop 193 forms the DATA RCVD line connected to gate 91 (FIG. 5B), thereby enabling gate 91 to turn the charge circuit "On" after the last channel data has been interrogated and its data received.

When the $\overline{STRTRCVR}$ signal from the control unit goes low it causes the line 25 to be placed at +5 volts by turning "On" transistor 165. The remote station addressed then drives the line 25 providing the data pulses DA and DB (FIG. 4) which are buffered by the amplifier circuit 179. The negative going leading edge of the first pulse DA, at time $T_C$ is applied to the counter 183 and a count of one is registered. This causes the $Q_0$ output to go high signaling the begin count, $\overline{BEGCNT}$, applying the 5 MHz clock signal to the 12-stage counter 187. When the second data pulse, DB, occurs at time $T_D$, $Q_0$ goes low and $Q_1$ output goes high, registering a count of 2. The $\overline{BEGCNT}$ going low disables the clock from the counter 187. The number of 5 MHz clock pulses registered by counter 187 during the time period between $T_C$ and $T_D$ corresponds to the data or calibration value transmitted by the addressed remote station/sensor. The processor 31 (FIG. 1) is notified that data is ready by connecting the $Q_1$ output (STOPCNT) of counter 183 to a control input of the processor. Following the delay of 20μ seconds by one-shot 189 to allow transfer of the registered count from counter 187 to the processor, the CLEAR line goes high, thereby clearing counters 183 and 187. Flip-flop 193 is set to activate the DATA RCVD signal and flip-flop 161 (FIG. 5B) is reset to release the line 25 back to the 15-volt level so that the next channel may be addressed. If the last channel has been received, the DATA RCVD signal applied to gate 91 will cause the output to go low, setting flip-flop 93. This activates the automatic charge mode, as explained above.

The data processor may be either a hardware controller to interface between the receiver and the asychronous recording device or a programmable computer (mini- or micro-). For a hardware-type controller the converted data from the receiver may be stored in buffers (small quantities of memory on the order of 1024, 16-bit words) during the interrogation phase of each one second interval and then rapidly recorded on magnetic tape during the charging phase of the one second interval. If a mini- or micro- computer is used in place of the hardware controller, then in addition to using it to achieve the overall system control, it is also capable of using the acquired data to perform calculations necessary to provide process control signals when used to control and monitor a process.

Figure 6:
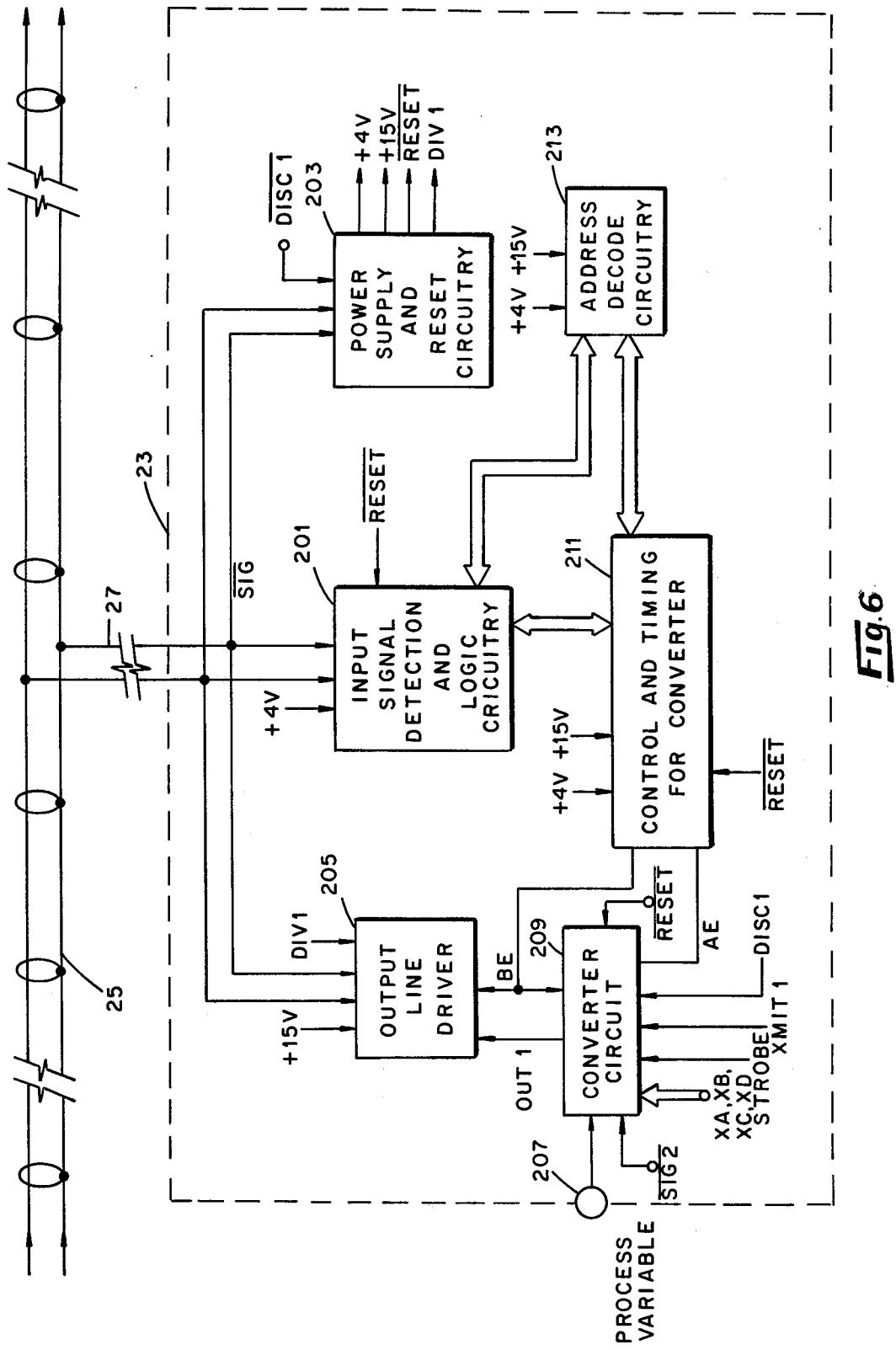
FIG. 6 is a block diagram of one of the remote stations/sensors shown in single block form in FIG. 1.

Referring now to FIG. 6, there is shown a block diagram illustrating the major functional sections of a remote station/sensor 23. Having described the MIS 21 (FIG. 1) and its function of transmitting and receiving the various address, control and data signals, a typical remote station sensor 23 and its function in synchronism with the MIS 21 will be described. The remote station/sensor 23 is coupled directly to the main line 25 or optionally indirectly by a branch line 27. The signal on the transmission line, identified as $\overline{SIG}$ consists of the three basic phrases (charge, address, and data transmit). As shown in FIG. 6, the $\overline{SIG}$ line is connected to an input detection and logic circuit 201, a power supply and reset circuit 203 and an output line driver circuit 205. The process variable measured by the particular remote station/sensor 23 may be supplied by means of a transducer 207 to the input of a converter circuit 209. A control and timing circuit 211 and an address decode circuit 213 operate in conjunction with the input signal detection and logic circuit 201 to properly synchronize the address decoding and transmission of the data pulses DA and DB to the MIS 21 when the remote station/sensor 23 is addressed. The various connections between the general components shown in block form in FIG. 6 are indicated to aid in showing the interconnection of the components. The circuits contained in the block diagram in FIG. 6 will be described individually with reference to FIGS. 7 and 8.

Figure 7:
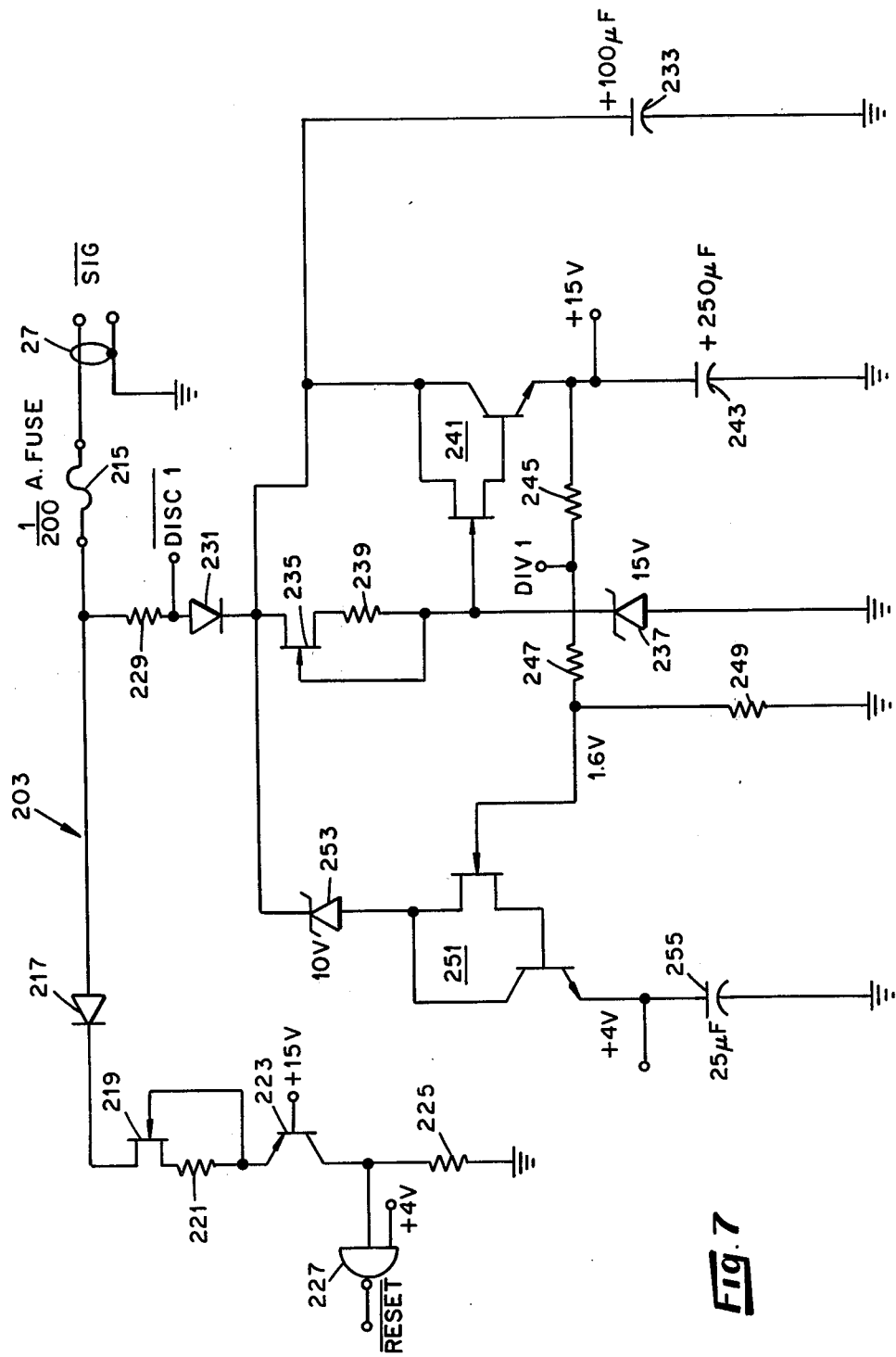
FIG. 7 is a schematic diagram of the power supply shown in block form in FIG. 6.

Referring now to FIG. 7, wherein there is shown the power supply and reset signal generating circuit 203, it will be seen that the $\overline{SIG}$ line has its center conductor connected to a fuse 215 and the shield is connected to ground. The other end of fuse 215 is connected through a diode 217 to the drain electrode of a field effect transistor (FET) 219. The source electrode of FET 219 is connected through a resistor 221 to the emitter of a transistor 223 which has its gate connected to the +15 volt supply from the power supply section of FIG. 7. The collector of transistor 223 is connected to ground through a resistor 225. The reset signal $\overline{RESET}$ is provided by the output of a NAND gate 227 which has one input connected intermediate the collector of transistor 223 and resistor 225. The other input of NAND gate 227 is connected to the +4 volt supply.

The $\overline{RESET}$ signal is derived from a constant current provided by FET 219 during the charging phase of $\overline{SIG}$ turning transistor 223 "On". The voltage drop across the load resistor 225 provides a logic "1" signal (+4 V) to gate 227 causing the output to go low, thereby generating the $\overline{RESET}$ signal during the charging phase. Diode 217 biases the input so that $\overline{SIG}$ must be at least +18.5 volts to generate $\overline{RESET}$, which is required only during the charge phase.

The power supply portion of the circuit of FIG. 7 is connected to the $\overline{SIG}$ line through a series resistor 229 and a diode 231. Diode 231 is connected with the anode toward the line so that it blocks the power supply voltage to the line during the address and transmit operating modes. An intermediate buffer storage capacitor 233, which is charged through resistor 229 and diode 231, is connected between the cathode of diode 231 and ground. The power supply provides regulated +15 volt and +4 volt supply voltages for all the components shown in FIG. 6. All of the voltages are derived from $\overline{SIG}$ during the charging phase. Capacitor 233 is charged when the line voltage exceeds its stored voltage by 0.7 volt, the forward bias voltage of diode 231. The charging current is limited by resistor 229. An FET 235 is connected at its drain electrode to to the cathode of diode 231 and the source is connected to the cathode of a 15-volt zener diode 237 through a resistor 239. The gate of FET 235 is connected intermediate the resistor 239 and zener diode 237 connection. The anode of diode 237 is connected to ground. FET 235 in conjunction with resistor 239 provides a constant current of 5 microamperes to zener 237 which develops 15 volts, regulating a buffer transistor circuit 241 connected to the cathode of zener 237. The transistor circuit 241 current path is between the positive charged side of capacitor 233 and a filter/storage capacitor 243 connected between the circuit 241 and ground. The regulated charge on capacitor 243 provides the +15 volt supply line for the remote station/sensor.

The +15 volt regulated line is connected through a voltage divider network consisting of resistors 245, 247 and 249 connected in series between the +15 volt supply and ground. A reference voltage terminal (DIV 1) is connected intermediate resistors 245 and 247 and the regulated voltage for the +4 volt supply is provided by connecting the input of a second transistor regulator circuit 251 intermediate resistors 247 and 249. The source for the voltage regulator 251 is connected through a 10-volt zener diode 253 to the positive side of capacitor 233. The output of the regulator 251 provides the regulated +4 volts which is stored by a filter/storage capacitor 255, connected between the output of the regulator circuit 251 and ground.

Figure 8B:
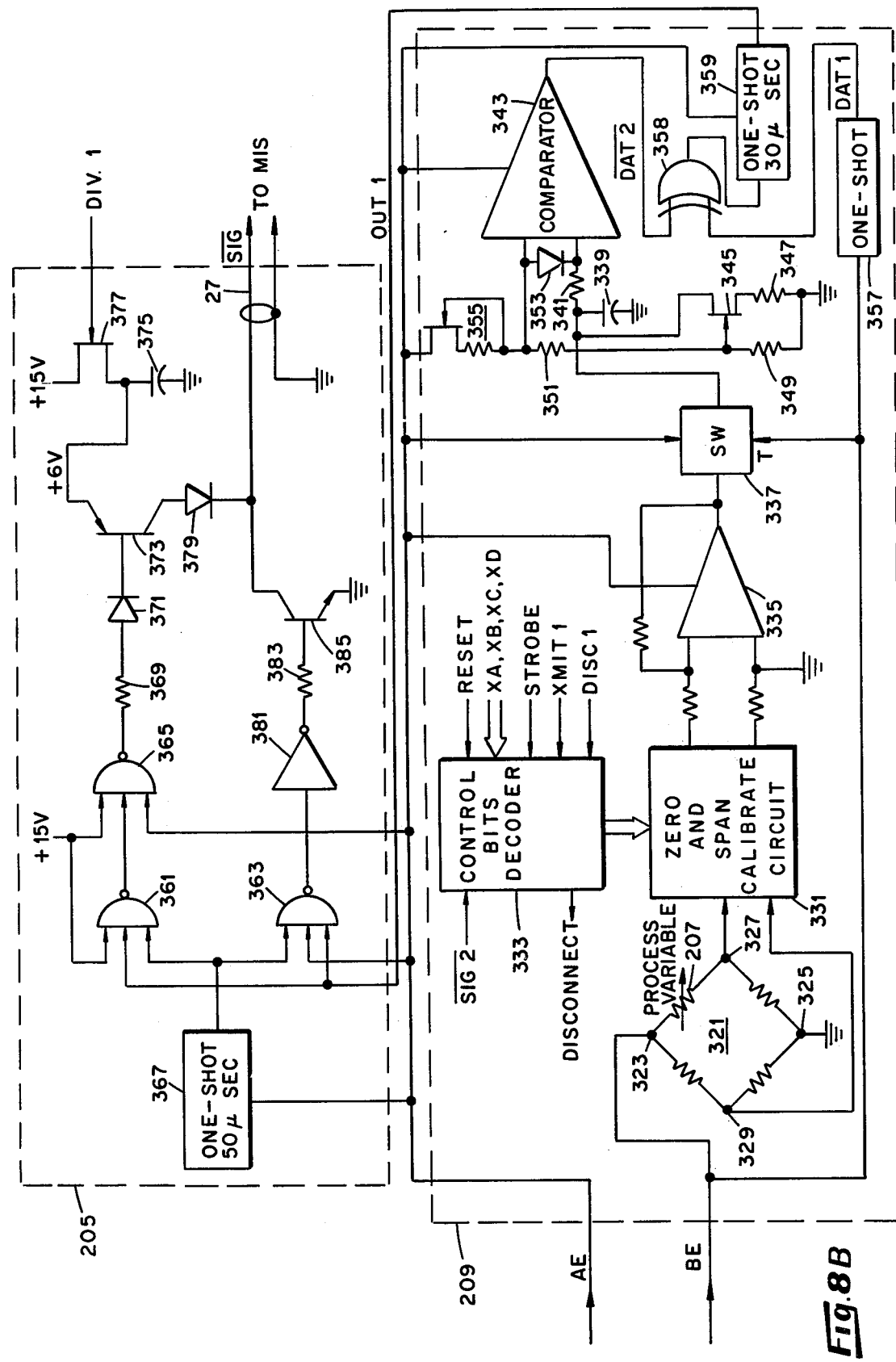
FIG. 8, which consists of FIGS. 8A and 8B arranged as shown in FIG. 8, is a logic diagram of the remote station/sensor shown in block form in FIG. 6 and referenced to like components of FIG. 6.

Referring now to FIG. 8, which includes FIGS. 8A and 8B arranged as shown in FIG. 8, the various other components shown in block form in FIG. 6 will be described in detail. The components are outlined and numbered to correspond to FIG. 6. As shown in FIG. 8A, the input signal detection and logic circuitry 201 is connected to the center conductor of $\overline{SIG}$ line 27 by connecting the drain electrode of an FET 257 to line 27. The source electrode of transistor 257 is connected to ground through a pair of series resistors 259 and 261. The gate electrode of FET 257 is connected intermediate resistors 259 and 261. The FET 257 and resistor 259 form a threshold detector which delivers 4 microamperes to the load resistor 261 at line voltage levels exceeding 7.5 volts. Therefore, the data signals from the remote station/sensors which are at the +5 volts level and zero volt level (time $T_B-T_E$, FIG. 4) are not detected by the input circuit 201. The gate electrode of FET 257 is connected to one input of a NAND gate 263 which has its second input connected to the +4 volt supply. Gate 263 acts as a logic inverting and pulse squaring element. The output of gate 263 is connected to one input of a NAND gate 265 which has a $\overline{HOLD}$ signal line connected to the other input thereof. The $\overline{HOLD}$ signal applied to gate 265 disables the circuit that follows it for 600μ seconds. The purpose of the $\overline{HOLD}$ signal is to reduce power consumption in gates 287, 265, 267, 269 and in counters 289 and 291. 600μ seconds is the maximum hold time that can be used without affecting the address signal detection. $\overline{HOLD}$ is generated after the signals $\overline{SHUTDOWN}$ or $\overline{START\ XMIT}$ occur. This prevents power loss in a number of the CMOS gates and counters which operate during or following the address mode. CMOS component power consumption is related to the time spent in the transition region of its operating range. Thus, as soon as the control circuit 211 is signaled that the address being transmitted does not match the remote station sensor, $\overline{HOLD}$ goes low preventing gate switching during the remainder of the address signal; or, when the station is addressed, the gates are disabled during the data transmission from the station to the MIS.

The output of gate 265 switches between the high and low logic state as the address is transmitted via $\overline{SIG}$, generating the address code signal $\overline{SIG\ 2}$. This signal is compared with the local address generated by the station address circuit through an inverter in the exclusive OR gate 267. The output of gate 267 is connected to one input of a NAND gate 269 which has its second input connected to a STROBE line. If the address codes are not the same, the output of gate 267 will go high generating $\overline{SHUTDOWN}$ through NAND gate 269 when STROBE is high.

The STROBE signal is provided by the output of a NAND gate 271 which is connected to one input of gate 269 and one input of a NAND gate 273 whose output provides the start transmit ($\overline{START\ XMIT}$) once the station has been addressed. Gate 271 is connected at one input to the +4 volt supply and at the other input to the output of a NAND gate 275. Gate 275 has one input connected to receive a STROBE 1 signal and a second input connected to receive a STROBE 2 signal. The purpose of the STROBE 1 and STROBE 2 signals is to generate STROBE by means of decoder gate 275. STROBE 1 and STROBE 2 are the set and reset outputs of the second and third binary stages of a counter 289 whose function will be described.

To sense that the station has been addressed, a four-input NAND gate 277 is connected to receive signals XA, XB, XC, and XD, corresponding to four binary bits which are all high at the count of the full 16 address and control bits. The output of gate 277 is connected to one input of a NAND gate 279. The other input of NAND gate 279 is connected to the +4 volt supply. Gate 277 goes low when all inputs XA, XB, XC, and XD are high, causing a high at the output of gate 279 which forces the output of gate 273 low when STROBE is high generating $\overline{START\ XMIT}$. This can only happen when the address of the device is identical to the address of $\overline{SIG}$ and when the levels, timing and framing of all code bits in $\overline{SIG}$ from the MIS 21 are proper and without interferring noise.

The address decode circuit 213 essentially generates the same address as is being transmitted for the remote station being addressed. A 16-channel data selector 281 is provided with the 16 inputs. Excluding inputs 13 and 14 which are connected to the $\overline{SIG\ 2}$ line, the inputs are jumpered to the proper logic voltage levels to make up the address. Preamble bits 1 and 2 are provided with a logic "1" and a logic "0" voltage, respectively. The last two inputs, the postamble bits, 15 and 16, are also connected to a logic "1" and a logic "0", respectively. The output (ADD CLK) of the data selector 281 is connected through an inverter 283 to the exclusive OR gate 267 in the input detection and logic circuit 201 for comparison with the transmitted address according to $\overline{SIG\ 2}$. As long as the address bits compare the clock signal (200 kHz) from an oscillator 285 is applied through a NAND gate 287 to the input of a divide-by-six counter 289. The output of counter 289 is connected to the count input of a 4-stage BCD counter 291, which provides the corresponding 4-bit outputs XA, XB, XC and XD connected to gate 277. These outputs are also connected to the control inputs of the data selector 281 and as the counter 291 counts the 33.33 kHz pulses from the divider 289, it steps the selector 281 placing the logic level of each of the 16 inputs in order on the ADD CLK output for comparison with the $\overline{\text{SIG}}$ address which is transmitted at the same 33.33 kHz rate. By placing $\overline{\text{SIG}}$ 2 on pins 13 and 14 of the selector 281 these bits, which change depending on the mode selected, are accepted by comparator gate 267 and are decoded in the converter circuit 209.

Gate 287 is enabled by the clock enable line (CLK ENBL) from the control and timing circuit 211. The $\overline{\text{SIG}}$ 2 output from the input circuit 201 is connected to the set input (S) of an R-S flip-flop formed by NAND gates 293 and 295. The reset output, gate 295 output, forms the RESET 1 line, which is connected to the reset input of the BCD counter 291 and to the input of an inverter 297. The output of inverter 297 forms the CLK ENBL line connected to gate 287 and the reset input of the divide-by-six counter 289. The first preamble bit of the address signal, which is always the same, causes $\overline{\text{SIG 2}}$ to go low, setting the flip-flop 293-295. It remains set until one of three inputs to gate 295 goes low, causing it to reset. These inputs are $\overline{\text{RESET}}$ from the power supply, $\overline{\text{START XMIT}}$ form the output of gate 273 of the input circuit 201 and $\overline{\text{HOLD}}$ which is generated by $\overline{\text{SHUTDOWN}}$ going low or $\overline{\text{START XMIT}}$ going low. The $\overline{\text{SHUTDOWN}}$ and $\overline{\text{START XMIT}}$ lines are connected to separate inputs of an exclusive OR gate 299 whose output is connected to the input of a 600 microseconds one-shot 301. When either the $\overline{\text{SHUTDOWN}}$ or $\overline{\text{START XMIT}}$ goes low, the output of gate 299 goes high, triggering one-shot 301, causing a low output for 600μ seconds which prevents clock restart. The oscillator 285 is shut down during the transmit mode by connecting the $\overline{\text{START XMIT}}$ line to the set input of an R-S flip-flop 303 which has its reset input connected to the $\overline{\text{RESET}}$ line. The reset output $\overline{Q}$ of flip-flop 303 is connected to one input of a NAND gate 305 which has its other input connected to $\overline{\text{RESET}}$. Remembering that $\overline{\text{RESET}}$ remains low during the charging mode, this disables gate 305, keeping its output high until $\overline{\text{RESET}}$ returns to the high state, even though flip-flop 303 has been reset. The output of gate 305 is connected through an inverter 307 to the power supply input of oscillator 285. Thus, when OSC, PWR, the output of inverter 307, goes high, oscillator 285 is turned "On". The oscillator 285 is powered up when $\overline{\text{RESET}}$ goes high and stays up until $\overline{\text{START XMIT}}$ goes low. Therefore, power is conserved since the oscillators at each remote station are active only until that station is addressed and begins a transmit sequence.

Once the station has been addressed (XA, XB, XC, and XD all high), the output of gate 277 ($\overline{\text{XMIT 1}}$) goes low, triggering the sensor data transmit sequence. The output of gate 277 is connected to the inputs of a pair of one-shots 309 and 311 in the control and timing circuit 211. The output of one-shot 309 is connected through an inverter 313 to the base of a switching transistor 315 and one-shot 311 is connected through an inverter 317 to the base of a switching transistor 319. The emitters of both transistors 315 and 319 are connected to the +15 volt supply. The collector of transistor 315 supplies +15 volt power on line AE to the converter circuit for 1.2 milliseconds, the period of one-shot 309, during which time the process variable is measured, or calibration measurements are made. The collector of transistor 319 supplies power on line BE to the converter circuit also for 100 microseconds, the period of one-shot 311 (time $T_B$–$T_C$ shown in FIG. 4), which begins simultaneously with the period of one-shot 309.

Referring now to FIG. 8B, the process variable to be measured by the particular remote station/sensor may take various forms. Here, the process variable is in the form of a resistance device 207 which forms one leg of a bridge 321 having input terminals 323 and 325 connected to the bridge excitation line BE and ground, respectively. The output terminals 327 and 329 of the bridge are connected to separate inputs of a zero and span calibration control circuit 331. According to the state of the calibration control bits 13 and 14, as decoded by a control bit decoder 333, the circuit 331 performs a zero, span or normal process variable measurement according to the control bits code, as will be explained hereinbelow. The various signals from FIG. 8A to the decoder 333 are shown as inputs referenced to the particular functional signal lines of FIG. 8A. A disconnect line output is shown whose function will also be described hereinbelow. The outputs from circuit 331, which are normally the bridge outputs, except during a calibration measurement, are connected to the inputs of an amplifier 335. The amplifier 335 is powered only during the 1.2 millisecond period by connecting the power input of the amplifier 335 to the amplifier excitation (AE) line. The output of amplifier 335 is connected through an electronic switch 337, powered by the AE line, to the positive side of a storage capacitor 339 which has its negative side connected to ground. The voltage value switched through the circuit 331, amplifier 335, and switch 337 is then stored by capacitor 339 during the 100 microsecond time period that BE supplies power to the bridge 321. This is controlled by connecting a trigger input (T) of switch 337 to the BE line.

The positive side of capacitor 339 is connected through a resistor 341 to one input of a comparator 343 and to the drain electrode of an FET 345. The source electrode of FET 345 is connected to ground through a resistor 347 and the gate electrode is connected to ground through a resistor 349. Further the gate electrode of FET 345 is connected to the second input of comparator 343 through a resistor 351. A diode 353 is connected between the inputs of comparator 343 to prevent large negative inputs to the comparator. A constant current source circuit 355 is connected between the AE line and the second input of comparator 343 to develop a reference voltage for the comparator's lower threshold and for discharging transistor 345.

The BE line is further connected to the input of a one-shot 357 which is triggered when BE is turned "Off" to generate a negative going pulse $\overline{\text{DAT 1}}$ at the output. $\overline{\text{DAT 1}}$ is timed to begin 100 microseconds (time $T_B$–$T_C$, FIG. 4) after the transmitter is triggered and produces the data pulse DA which is a 30 microsecond pulse. $\overline{\text{DAT 1}}$ is connected to one input of an exclusive OR gate 358 which has its second input connected to the output ($\overline{\text{DAT 2}}$) of comparator 343. $\overline{\text{DAT 2}}$ goes low when the capacitor 339 has discharged to the lower threshold level of comparator 343, changing the output of comparator 343 from the high to the low state. Thus, the timing of $\overline{\text{DAT 2}}$, which triggers the DB data pulse (FIG. 4), depends on the charge stored by capacitor 339 during the 100 microsecond measurement time. The stored charge is proportional to the process variable measurement. Capacitor 339 discharges linearly by means of a constant current source from transistor 345, resistors 347 and 349 to the lower threshold voltage level set by resistors 351 and 349. Thus, the time between pulses DA and DB is proportional to the input voltage from the bridge 321 to the amplifier 335.

The output of OR gate 358 is connected to the input of a one-shot 359 which has a power input connected to the AE line. One-shot 359 produces a positive going 30 microsecond pulse (OUT 1) when $\overline{DAT\ 1}$ goes low and again when $\overline{DAT\ 2}$ goes low.

The OUT 1 pulses are transmitted to the MIS through the output line driver circuit 205. The output circuit 205 is clamped onto the line 27 ($\overline{SIG}$) only during the time $T_B$ to $T_E$ (FIG. 4) when it is the selected remote station, at all other times it is released. The driver is controlled by OUT 1 from the converter 209.

The output of one-shot 359 (OUT 1) is connected to one input of a NAND gate 361 and one input of a NAND gate 363. The output of gate 361 is connected to one input of a NAND gate 365. The AE signal line is connected to one input of gate 363 and one input of gate 365. Further, line AE is connected to the input of a one-shot 367 which produces a 50 microsecond negative going pulse when AE first goes high. The output of one-shot 367 is connected to corresponding inputs of gates 361 and 363, respectively. The 50 microsecond pulse disables gates 361 and 363 to remove an extraneous pulse which occurs at time $T_B$ in OUT 1. The output of gate 361 is connected to a second input of gate 365 and the third inputs of gates 361 and 365 are connected to the +15 volt source to place a high on these inputs. The output of gate 365 is connected through a resistor 369 and a blocking diode 371 to the base of a PNP transistor driver 373. Transistor 373 has its emitter connected to ground through a filter capacitor 375. A +6 volt clamping voltage is supplied to the emitter of transistor 373 from the source electrode of an FET 377 which has its drain connected to the +15 volt line and its gate connected to the DIV 1 line from the power supply 203, see FIG. 7. The collector of transistor 373 is connected to the center conductor of $\overline{SIG}$ line 27 through a blocking diode 379. Diode 379 prevents the high voltage from appearing on the collector of transistor 373 during the charge mode.

To complete the output circuit, the output of gate 363 is connected through an inverter 381 and a resistor 383 to the base of an NPN transistor 385. The collector of transistor 385 is connected to the center conductor of $\overline{SIG}$ line 27 and the emitter is connected to ground.

At time $T_B$ the $\overline{SIG}$ line is clamped at the +5 volt level for transmission of the data pulses DA and DB when the MIS releases the line to the addressed remote station. The +5 volt level is provided through the transistor 373 and source transistor 377. At time $T_C$, OUT 1 from the converter circuit 209 goes high causing the output of gate 361 to go low. This, in turn, causes the output of gate 365 to go high, turning transistor 373 "Off". At the same time the output of gate 363 goes low causing the output of inverter 381 to go high, turning transistor 385 "On", clamping $\overline{SIG}$ to ground for 30 microseconds. This corresponds to the DA pulse period transmitted to the MIS. At time $T_D$ the same operation is repeated and the DB pulse is transmitted to the MIS. These pulses are processed and stored as explained above.

The system operates in such a manner that the transmission line ($\overline{SIG}$) is clamped to a low impedance voltage source or to ground at all times except during some signal transition times. By maintaining the line clamped, line noise is suppressed resulting in a minimum of errors.

Figure 11:
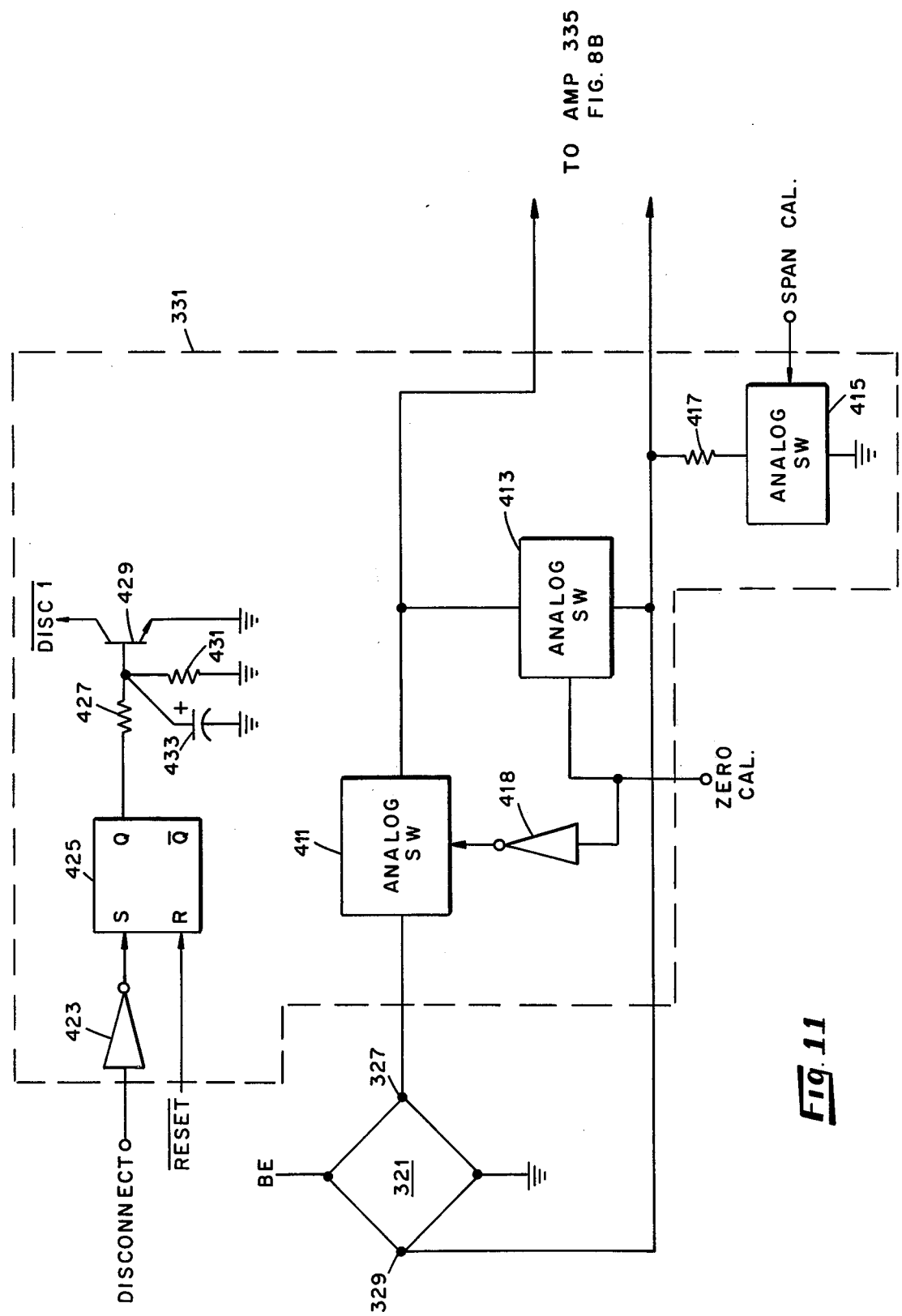
FIG. 11 is a diagram of the zero and span calibration circuit shown in block form in FIG. 8B.

Referring now to FIGS. 9, 10, and 11, the structure and operation of the control bits decoder 333 and the zero and span calibrator 331 shown in FIG. 8B will be described in detail. As shown in FIG. 9, the bits 13 and 14 codes for the control commands are measure, zero, calibrate, span calibrate, and disconnect. In FIG. 10 there is shown a logic diagram of the control bit decoder circuit 333 shown in block form in FIG. 8B. The inputs XA, XB, XC, and XD from counter 291 and the input STROBE from gate 271 (FIG. 8A) are applied to inverters 391, 392, and 393 and AND gates 395 and 397, as shown. The outputs of gates 395 and 397 are connected, respectively, to the clock inputs of a pair of D type flip-flops 399 and 401. The D inputs of flip-flops 399 and 401 are connected to the output of an inverter 402 whose input is $\overline{SIG\ 2}$ from gate 265 (FIG. 8A). The set output Q of flip-flop 399 is connected to one input each of a pair of AND gates 403 and 405. The reset output of flip-flop 399 is connected to one input each of a pair of AND gates 407 and 409. The set output Q of flip-flop 401 is connected to the second input each of AND gates 403 and 407. The reset output ($\overline{Q}$) of flip-flop 401 is connected to the second input each of AND gates 405 and 409. The XMIT 1 line from gate 277 (FIG. 8A) is connected to the third input each of AND gates 403, 405, 407, and 409. The inverters 391 and 392 make all the inputs to gate 395 high at the BCD count of 12, corresponding to bit 13 of $\overline{SIG}$. (The 16 channels are counted 0–15). The inverter 393 makes all the inputs to gate 395 high at the BCD count of 13, corresponding to bit 14 of $\overline{SIG}$. Thus, these two gates generate bit 13 and bit 14 clock pulses during the high state of the STROBE pulse at the times when $\overline{SIG\ 2}$ contains the control bit information associated with bits 13 and 14 of $\overline{SIG}$. As a result, the CLK pulses latch the control bits 13 and 14 states into the flip-flops 399 and 401 via $\overline{SIG\ 2}$. The output of these flip-flops remain until new values are clocked in or until they are reset by $\overline{RESET}$ connected to the direct reset inputs R of flip-flops 399 and 401. Gates 403–409 decode the bit 13 and 14, information temporarily stored in flip-flops 399 and 401 to generate the control command signals. The output of gate 403 is high when both bits 13 and 14 are high, signaling a disconnect mode as will be explained. The output of gate 405 is high when bit 13 is high and bit 14 is low signaling a span calibration measurement. The output of gate 407 is high when bit 13 is low and bit 14 is high, signaling a zero calibration measurement. The output of gate 409 is high when both bits 13 and 14 are low signaling a normal process variable measurement. These outputs are used as control inputs for the zero and span calibration circuit shown in block form in FIG. 8B and shown in detail in FIG. 11, except for the measure command signal which is the normal operating mode state of the remote sensor and is, therefore, not needed here as a control mode.

Referring now to FIG. 11, the zero and span calibration control circuit 331 is shown enclosed within dashed lines 331. The output terminal 329 of the bridge 321 connects straight through to one input of amplifier 335. The bridge output terminal 327 is connected to the input of an electronic analog switch 411 whose output is connected to the other input of amplifier 335. A second electronic analog switch 413 is connected across the output lines of circuit 331. A third electronic analog switch 415 is connected between the through lead via a resistor 417 and ground. The zero calibrate output from FIG. 10 is connected to the trigger input of switch 413 and through an inverter 418 to the trigger input of switch 411. The span calibrate output from FIG. 10 is connected to the trigger input of switch 415.

For a zero calibration, the zero calibration signal is high opening switch 411 and closing switch 413. This removes the bridge 321 from the circuit and shorts the amplifier 325 input through switch 413. In the normal measurement mode, zero calibrate is low and the output of inverter 418 is high, thereby keeping switch 411 closed. Obviously, other switching arrangements may be used in which the measurement output signal from FIG. 10 is employed for the normal measurement switching operation. The span calibration is accomplished by upsetting one side of the bridge 321 through resistor 417 with switch 415 during a span calibration command from the circuit of FIG. 10. Only one function is performed on any given transmit cycle. A measurement is accomplished with switch 411 closed and switches 413 and 415 open.

The $\overline{\text{DISC 1}}$ signal is generated to disconnect the particular remote station from the $\overline{\text{SIG}}$ line. To accomplish this operation the initial channel address switches 109 (FIG. 5B) and the last channel address switches 119 of the MIS are set for the same address. The switch 144 (FIG. 5A) in the MIS is switched from the normal position, as shown, to the disconnect position which holds the calibration bits 13 and 14 of $\overline{\text{SIG}}$ high (+15 V). This is decoded by the addressed remote station in the decoder 333 (FIG. 10), as explained above to generate the DISCONNECT signal. As shown in FIG. 11, the DISCONNECT input is connected through an inverter 423 to the set input (S) of an R-S flip-flop 425. The reset input is connected to the $\overline{\text{RESET}}$ line from the power supply 203. The set output Q of flip-flop 425 is connected through a resistor 427 to the base of a NPN transistor 429. The base of transistor 429 is connected through a resistor 431 to ground. The emitter of transistor 429 is connected to ground and the collector electrode forms the $\overline{\text{DISC 1}}$ line which is connected to the $\overline{\text{DISC 1}}$ input of the power supply (FIG. 7). A capacitor 433 is connected between the base of transistor 429 and ground. Capacitor 433 prevents the fuse 215 (FIG. 7) from blowing during the initial 30 second charging phase. It holds the base of transistor 429 in a cutoff condition until $\overline{\text{RESET}}$ has had time to reach a low state, thereby resetting the flip-flop 425.

When flip-flop 425 is set by DISCONNECT this biases transistor 429 into saturation by means of resistors 427 and 431. While in this heavily conducting state, the current into the collector is sufficient to blow fuse 215 via signal line $\overline{\text{DISC 1}}$ if the voltage on $\overline{\text{SIG}}$ is held at +15 volts for at least 10 seconds. The line may be held at +15 volts by means of operator switch 60 (FIG. 5B) in the MIS. This action removes the selected remote station from the $\overline{\text{SIG}}$ line and eliminates the need for going out to disable a unit that is malfunctioning or otherwise interferring with the operation of the acquisition system.

Thus, it will be seen that a very versatile data acquisition system has been illustrated in which only a single transmission line may be used to couple 330 remote station/sensors to a master interrogating station (MIS). The system may be modified to increase the channel capacity from 330 to 512 by reducing the data transmission phase (time $T_B$ to $T_E$, FIG. 4) down from 1000 microseconds to 500 microseconds if a 2 to 1 reduction in resolution can be tolerated in the received data. This would yield a channel time of 1000 microseconds and a charging time in the automatic cycle:

Charging time = 1000 − 15 − N(1) = 473 ms for N = 512.

The system requires much less copper and conduit for transmission in that address and data signals and power are carried over the same transmission line, therefore it is less expensive to install and service. Since all signals and power terminate or originate at the master station, power line isolation is inherent at the remote stations reducing common mode interference. The remote stations may be connected at any point along the line with branches up to 500 feet. The remote stations may be assigned any address from 0 to 329, in the illustrated system, or 0 to 511 in an expanded system, and my be interrogated in any selected order. The remote stations may be readily interrogated by a non-computer system as illustrated or by computer control at the master interrogating station.

It will be obvious to those skilled in the art that various other modifications and changes may be made in the system without departing from the spirit and scope of the invention as set forth in the following claims.

What is claimed is:

1. A single transmission line interrogated multiple channel data acquisition system, comprising:
   a master interrogating station means for generating and transmitting a repeating interrogating signal including individual digital address codes for separately addressing a plurality of data channels and receiving quantitative data valves corresponding to a measured value from each separately addressed channel on a time shared basis;
   a plurality of remote station/sensor means corresponding to said plurality of data channels, each remote station/sensor means including means for generating its own digital address code and comparing it with each address code transmitted by said master interrogating station, generating a transmit command signal when the transmittal address matches the address generated by said remote station/sensor, and a measuring and transmitting circuit means responsive to said transmit command signal for measuring and transmitting the corresponding channel quantitative data value in the form of a pulse position coded signal, said measuring and transmitting circuit means including a charge storage means for receiving and storing a charge proportional to said quantitative data value being measured and switching means for subsequently generating said pulse position coded signal at an output thereof corresponding to said stored charge;
   a single transmission line coupled between said master interrogating station and each of said plurality of remote station/sensor means in parallel for transmitting said address codes to each of said plurality of remote station/sensor means and said pulse position coded signals from the output of each one of said plurality of remote station/sensor measuring and transmitting circuit means to said master interrogating station; and
   a termination diode connected at the remote end of said transmission line.

2. The multiple channel data acquisition system as set forth in claim 1 wherein said master interrogating station means further includes means for applying a charging voltage on said transmission line for a predetermined period following each addressing and data transmitting sequence and wherein each of said remote station/sensors further includes a charge storage power supply means for receiving said charging voltage and storing a charge in response thereto for supplying power to operate said remote station/sensor.

3. The multiple channel data acquisition system as set forth in claim 2 wherein said master interrogating station includes a transmitter means for generating said interrogating signal including means for generating and transmitting a digital address code in the form of a plurality of series bits, a receiver means for receiving said pulse position coded signal from each addressed remote station/sensor and converting said pulse position coded signal to a binary data value corresponding to said quantitative value, a control circuit means for automatically, repeatedly, sequentially controlling the time shared transmission of said address signal from said transmitter means to said plurality of remote station/sensors and the transmission of said pulse position coded signal from the addressed one of said remote station/sensors to said receiver means so that each remote station/sensor is addressed and the corresponding channel data is received in a predetermined repeated scanning sequential order, and controlling the application of said charge voltage to said transmission line at the beginning of each said repeated scanning sequence.

4. The multiple channel data acquisition system as set forth in claim 3 further including means for selectively and remotely calibrating each of said remote station/sensors for zero and span;

wherein each of said remote station/sensors includes a data value measuring transducer;

wherein said master interrogating station further includes means for selectively transmitting calibration commands to an addressed one of said plurality of remote station/sensors for separately transmitting a zero calibration measurement command, and a span calibration measurement command to the said addressed one of said remote station/sensors to be calibrated, and separately receiving data values by means of said pulse position code transmission from said measuring and transmitting means of the station/sensor being calibrated corresponding to said zero and span calibration measurements; and wherein each of said remote station/sensors includes switching means responsive to said zero and span calibration commands for obtaining said zero and span calibration measurements, respectively, and supplying said calibration measurements to said measuring and transmitting means.

5. The multiple channel data acquisition system as set forth in claim 4 further including means for remotely disconnecting any selected one of said remote station sensors from said transmission line.

* * * * *